Oct. 20, 1970 J. L. HENKES, JR 3,535,417

METHOD OF MAKING TAPE REPLICAS

Filed June 25, 1968

Inventor:
John L. Henkes, Jr.,
by Richard R. Brainard
His Attorney.

United States Patent Office
3,535,417
Patented Oct. 20, 1970

3,535,417
METHOD OF MAKING TAPE REPLICAS

John L. Henkes, Jr., Loudonville, N.Y., assignor to General Electric Company, a corporation of New York Filed June 25, 1968, Ser. No. 739,867
Int. Cl. B29c *1/02, 3/00;* B29f *5/00*
U.S. Cl. 264—227 5 Claims

ABSTRACT OF THE DISCLOSURE

Replicas of a tape having information stored thereon as a pattern of thickness deformations are produced by forming a surface layer on the tape and stripping it therefrom to provide a master, joining the ends of the master to form a closed loop having the full length of the tape to be replicated, passing the loop over a succession of rollers each of which, together with a cooperating presser roller, provides an embossing station. The master is preferably of metal and formed with integral projections corresponding to the drive sprocket openings in the tape to be replicated and these projections are used to drive the medium on which the replica is formed to insure positional synchronism. In another embodiment, the pressing master is made by first forming a metal pin board having projections corresponding to the sprocket openings and then forming a pressing master on the pin board which may then be used as in the first embodiment.

The present invention relates to a method of making tape replicas of information recorded on tape in the form of thickness deformations.

In recent years, methods of recording information in the form of a pattern of thickness deformations of a thermoplastic recording layer have been developed. Such methods are disclosed and claimed, for example, in Pat. No. 3,113,179, Glenn, Jr., granted Dec. 3, 1963 and in Pat. No. 3,291,601, Gaynor. In both methods, the deformations are provided by establishing an electrostatic charge pattern corresponding to the information to be recorded on the recording layer and then heating or otherwise softening the thermoplastic to produce the deformation.

The recording media used in these methods are often in the form of flexible tapes having a deformed surface or recording layer. The deformations, as described in the above patents, may be in the form of light diffraction gratings, which are capable of reproducing the information, either by optical or electron beam readout systems. In many applications, there is a need for economical methods of making high quality replicas of the original recording. In my Pat. No. 3,265,776, granted Aug. 9, 1966, there is described and claimed a method of making tape replicas by casting or pressing a liquid or semi-liquid material onto the original recording and then stripping it off to provide the replica. The present invention is an improvement over the invention claimed in my above patent and relates particularly to an improved method and apparatus for making multiple tape replicas and for insuring positional synchronism between the drive or sprocket openings in the replica and the information recorded on the replica.

In accordance with a preferred embodiment of the present invention, replicas of a tape having information stored thereon as a pattern of thickness deformations are produced by forming a surface layer on the tape and stripping it therefrom to provide a master, joining the ends of the master to form a closed loop having the full length of the tape to be replicated, passing the loop over a succession of rollers each of which, together with a cooperating presser roller, provides an embossing station.

The master is preferably of metal and formed with integral projections corresponding to the drive sprocket openings in the tape to be replicated and these projections are used to drive the medium on which the replica is formed to insure positional synchronism. In another embodiment, the pressing master is made by first forming a metal pin board having projections corresponding to the sprocket openings and then forming a pressing master on the pin board which may then be used as the first embodiment.

The features and advantages thereof will become more apparent as the following description proceeds, reference being had to the accompanying drawing and the scope will be pointed out in the appended claims.

Figures 1, 3:
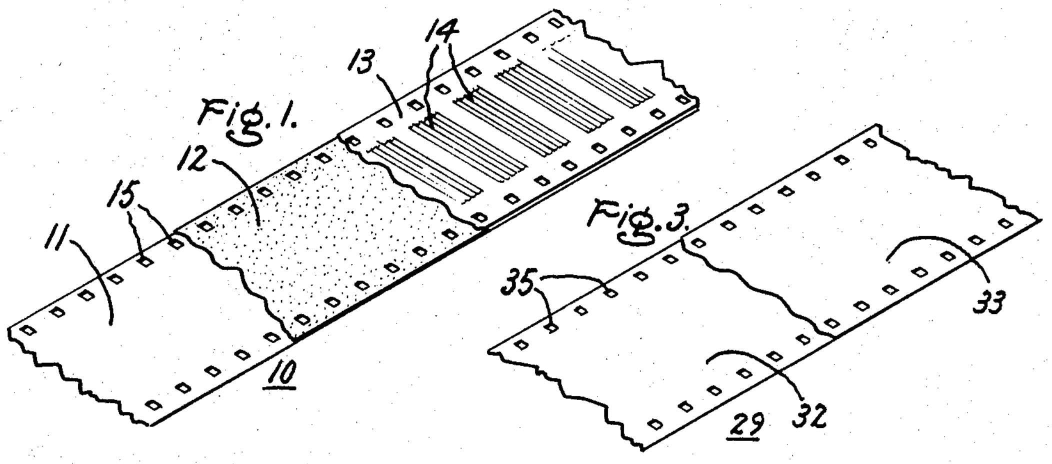
FIG. 1 is a fragmentary view of a thermoplastic recording on a three-layer tape.
FIG. 3 illustrates a two-layer plastic sheet or tape suitable for the replicas.

A thermoplastic recording on a three-layer tape is illustrated in FIG. 1 and is of a type that may be replicated in accordance with the present invention. This recording may, for example, be made in accordance with the method of Glenn Pat. 3,113,179, in accordance with which method the recording surface is scanned with an electron beam modulated in accordance with the information to be recorded, the tape being subsequently heated to produce the deformations and returned to a cooler state to retain the deformations independently of the charge pattern. The tape 10, as described in detail in the aforementioned Glenn patent, may include an optically clear base 11 of material such as polyethylene terephthalate available under the trademark "Cronar." A transparent conducting coating 12 overlies the base layer and a thin recording layer 13 of thermoplastic material overlies the transparent conducting coating. The recording layer may comprise a blend of polystyrene, m-terphenyl and a copolymer of butadiene and styrene. Other thermoplastic materials suitable for this purpose are described and claimed in Boldebuck Pat. No. 3,068,-372, granted Nov. 13, 1962.

As shown in FIG. 1, the recording layer 13 includes the information containing deformations which are schematically shown at 14 and, as described in the aforementioned Glenn patent, may be in the form of phase diffraction gratings. The tape also is provided with sprocket or drive openings 15 in the margin thereof which facilitate synchronization of the tape movement with the recorded information. It is to be understood that the tape recording is wound on a suitable storage reel and, in accordance with the first step of the present method, is provided on the deformed surface with a metal layer 16, which conforms exactly with the deformed surface so that when it is stripped from the recording, it provides a negative replica of the deformations. Such a metal layer may be provided by coating a thin copper layer on the tape recording by a method known as "electroless plating." The coating is preferably of copper and may be carried out in accordance with the process described in detail and claimed in Pat. No. 2,938,805, Agens, granted May 31, 1960. The copper coating is built up to a thickness of 5 microns or so by this process and by another step of a continuous process, if desired, the copper coating may be increased in thickness by normal electroplating techniques to about 4 mils, for example. The result is a thermoplastic tape recording with a metal film having one surface which conforms to the configuration of the recording surface of the recording and a back surface which is smooth. Nickel may be used for the electroplated layer, if desired.

Figures 2, 4:
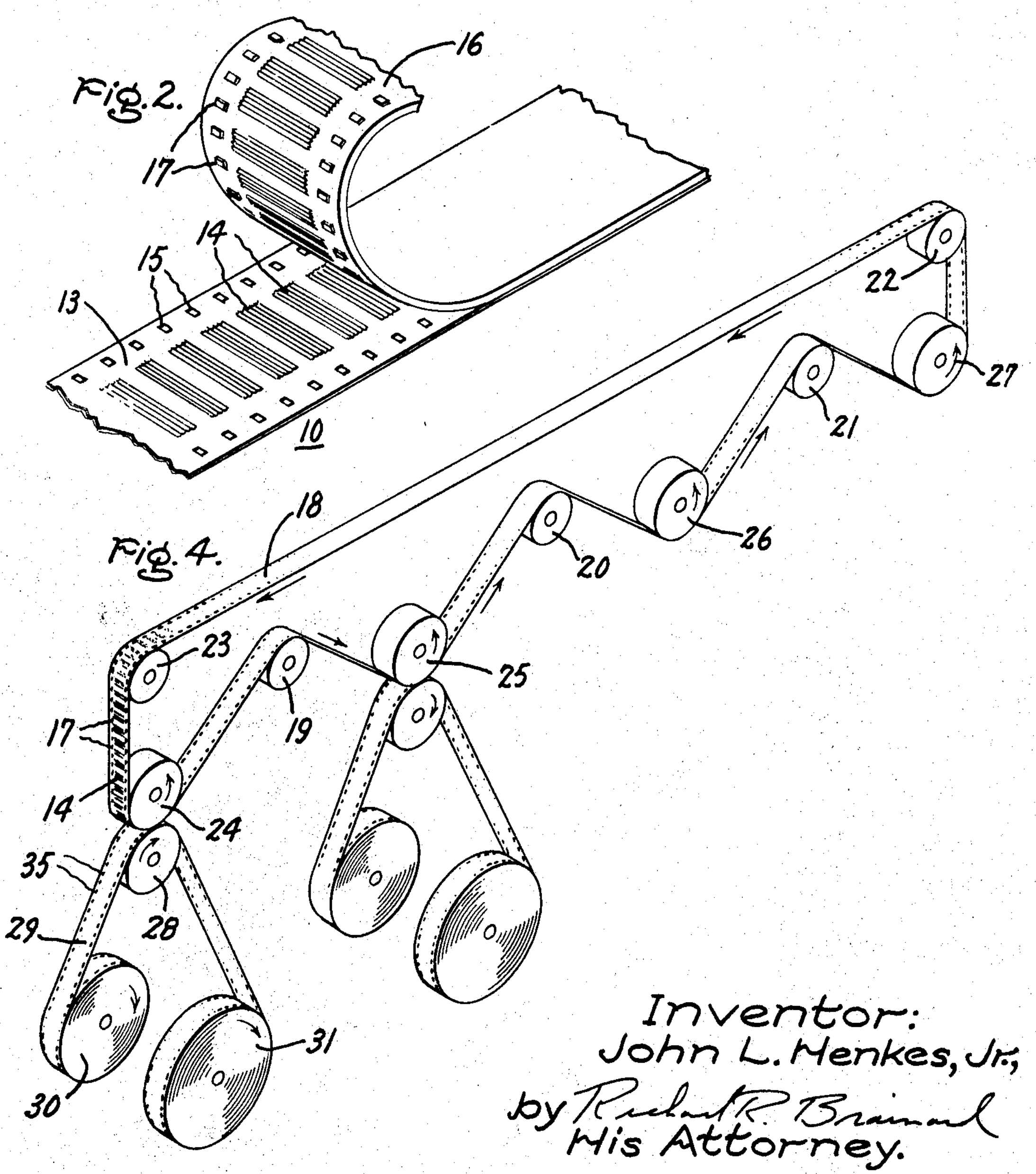
FIG. 2 shows the removal of the metal presser strip or master from the original thermoplastic recording.
FIG. 4 illustrates schematically apparatus embodying the present invention and for carrying out the method of the present invention.

As is illustrated in FIG. 2, this metal master or presser tape 16 is readily peeled from the recording and provides a durable self-supporting and highly faithful reproduction of the original recording and, if used for pressing, will produce positive replicas of the original recording. As shown in FIG. 2, the metal presser is formed with projections 17 corresponding to the sprocket openings 15.

In accordance with the preferred embodiment of the present invention illustrated in FIG. 4, a plurality of replicas are made simultaneously from a continuous belt metal presser 18 formed by joining the ends of presser 16 to provide a closed presser loop. The loop presser 18 having the full length of the recording to be replicated, is driven over a succession of pulleys or rollers 19–27, inclusive. Pulley 19 may be a drive pulley, for example, having recesses engaging the projections 17 on the metal master. Pulleys 20, 21, 22 and 23 may be considered guide or idler pulleys and rolls 24–27, inclusive, are resilient backup rollers for the embossing stations. It is apparent that the lugs 17 and embossing 14 on the metal master are directed outwardly from the backup rolls 24–27, inclusive, and pulleys 22–23 and are directed inwardly on pulleys 19–21, inclusive. These later pulleys are preferably recessed from the central areas of the faces thereof so that the pulley faces do not engage the information bearing deformations or embossings 14 of the master. A thermoplastic replica may be produced at each of the backup rollers 24–27, inclusive, but only two stations are illustrated and only one will be described. At backup roller 24 there is a mating pressing roller 28 which has resilient engagement with the roller 24. A supply of sprocketed two-layer tape 29 is fed over pressing roller 28 from supply reel 30 and taken up on reel 31. The tape 29 is illustrated in FIG. 3 and includes a base 32 and thermoplastic layer 33. Materials similar to those used in connection with the original tape for recording and described above may be employed. Cheaper materials may be utilized to advantage, however, since the electrical properties are not important. It is only essential that the materials be of good quality optically and that the mechanical and thermal properties be suitable so that deformations may be made by heating the recording layer and that they may be retained at all temperatures normally encountered in use and in storage. It is desirable that the substrate melt at a substantially higher temperature than the layer on which the recording is embossed. The recording layer 33 is 5 to 15 microns thick and may be selected from a number of classes of material such as acrylic, cellulose, polycarbonate, vinyl and polypropylene plastics. Since it need not soften while electrically charged, it may have a higher melting point than the recording layer of the original recording medium and may be in the order of 200° C., for example. The base 32 may be 2 to 4 mils thick and of a triacetate material such as used for photographic film bases.

The tape 29 is provided with sprocket openings 35 and these engage the projections 17 on the metal master at the embossing stations so that the replicated tape is completely synchronized with the metal presser. The pressing roller is a heated roller to soften the thermoplastic or, if desired, a separate heating roller may be used. The embodiment of the invention just described permits a number of tape replicas to be produced simultaneously and insures good synchronization between the master and the tape on which the replicas are produced.

In the foregoing description, the recorded information in the form of a pattern of thickness deformations is described as formed by deforming a thermoplastic in accordance with an electrostatic charge pattern. It will be readily apparent to those skilled in the art that in a broader aspect, the method of the present invention is equally applicable to replicating a pattern of information bearing thickness deformations formed in other ways. For example, an ordinary photographic film having a pattern of density variations may be employed as the starting recording and this recording converted to a pattern of thickness deformation by photographically exposing a tape having a gelatin layer incorporating suitable sensitizers. Ammonium dichromate $(NH_4)_2Cr_2O_7$, for example, renders the gelatin-coated tape sensitive to ultraviolet light. After exposure of the gelatin tape to ultraviolet light through the photographic film master, the tape may be developed in hot water to produce a recording in the form of a pattern of thickness deformations. This tape may then be used to produce a metal master in accordance with the previously-described embodiment of the present invention.

Instead of forming the entire pressing master of metal, as described above, it will be readily appreciated that the driving projections and the deformations including the recorded information, may be separately formed. For example, a metal substrate having metal projections spaced in accordance with the spacings of the sprocket openings in the tape to be replicated is formed by producing an electroformed layer on an unexposed and undeveloped layer of sprocketed thermoplastic tape. This metal tape with projections spaced in accordance with the spacing of the sprocket openings in the tape to be replicated may be considered a pin board, which is next coated with a plastic material in liquid or semi-liquid state and the information bearing deformations formed in this liquid or semi-liquid plastic material in the general manner described in my aforesaid patent 3,265,776. As described in that patent, the original recording is pressed into the semi-liquid plastic before it is cured. It will be appreciated, however, that, in accordance with the present invention, the material which is pressed into the liquid or semi-liquid plastic is provided with sprocket openings and is synchronized positionally on the metal substrate by the projections which extend into these openings. The pressing master thus formed includes a metal substrate with synchronizing positioning projections located thereon and with the embossed plastic layer. It is understood that the layer of semi-liquid plastic material is suitably cured before the original recording is removed. This master may be formed into a loop and utilized in the same manner as described in connection with the embodiment of FIG. 4 of the invention.

The result is a composite pressing master having a metal backing with the drive projections corresponding to sprocket opening spacing and a deformed plastic information bearing layer. The desired positional relationship between the sprocket openings and information on the replicated tapes is somewhat easier to obtain with this later embodiment of the invention.

It will be apparent to those skilled in the art that changes and modifications may be made in the present invention without departing from the true spirit and scope thereof and it is intended in the independent claims to cover all such changes and modifications as fall within the true spirit and scope of the invention.

What I claim as new and desire to secure by Letters Patent of the United States is:

1. The method of producing tape replicas of information stored as thickness deformations on a tape recording having driving openings along one edge thereof, comprising the steps of forming a self-supporting metal tape having projections thereon spaced to engage the driving openings in said tape recording, forming a surface layer on said metal tape having deformation patterns corresponding to the deformations on said tape recording in synchronized positional relationship to said projections, joining the ends of said metal tape together to provide a pressing master in the form of a closed tape loop, driving said master over one roller of an embossing station with the surface layer and said projections extending outwardly and supplying between the face of said master and a mating roller, a tape having sprocket openings engaging said projections and a deformable surface layer facing said master to produce a replica of said master with the deformations synchronized in position with the sprocket openings therein.

2. The method of claim 1 wherein said surface layer is metal and formed integrally with the metal tape and projections.

3. The method of claim 1 wherein said surface layer is a plastic layer which is deformed by pressing a tape recording into the plastic layer while it is semi-liquid and with the recording positioned by the projections on the metal tape.

4. The method of producing tape replicas of information stored as thickness deformation on a tape which comprises forming on said tape a metal layer of sufficient thickness to provide a self-supporting metal master having surface deformations corresponding to the deformations of the tape, removing the metal layer from the tape and joining the ends thereof together to form a closed loop, driving said master between a succession of mating rollers at a plurality of stations with the deformed surface thereof facing outwardly and supplying between the face of said master and the mating roller at each of said stations a tape having a deformable surface layer to form at each pair of mating rollers a replica of said master.

5. The method of claim 4 wherein the tape of the recording to be replicated is provided with sprocket receiving openings and the metal master is formed with corresponding projections which engage and drive the tape replica at each of the stations to synchronize the master and the replicated tape at that station.

References Cited

UNITED STATES PATENTS

| | | | |
|---|---|---|---|
| 837,061 | 11/1906 | Harris | 264—293 X |
| 2,094,280 | 9/1937 | Proctor | 117—10 X |
| 2,247,991 | 7/1941 | Daniel | 264—284 X |
| 2,274,570 | 2/1942 | Westerkamp | 264—220 X |
| 3,113,179 | 12/1963 | Glenn. | |
| 3,265,776 | 8/1966 | Henkes | 264—227 X |

ALFRED L. LEAVITT, Primary Examiner

T. E. BOKAN, Assistant Examiner

U.S. Cl. X.R.

117—10, 138.8, 145; 264—284; 346—74